United States Patent
Vigeh et al.

(10) Patent No.: US 8,991,008 B2
(45) Date of Patent: Mar. 31, 2015

(54) DOOR STOP PIN AND RELATED ASSEMBLY

(75) Inventors: Majid Vigeh, Newbury Park, CA (US);
Vivek Chopra, Simi Valley, CA (US);
Teofil Schintee, Porter Ranch, CA (US);
Ixachely Cabrera, Panorama City, CA (US)

(73) Assignee: Rexnord Industries LLC, Milwaukee, WI (US)

( * ) Notice: Subject to any disclaimer, the term of this patent is extended or adjusted under 35 U.S.C. 154(b) by 829 days.

(21) Appl. No.: 12/948,305

(22) Filed: Nov. 17, 2010

(65) Prior Publication Data

US 2011/0119865 A1    May 26, 2011

Related U.S. Application Data

(60) Provisional application No. 61/263,181, filed on Nov. 20, 2009.

(51) Int. Cl.
*E05F 5/02* (2006.01)
*B64C 1/14* (2006.01)

(52) U.S. Cl.
CPC ... *B64C 1/14* (2013.01); *E05F 5/02* (2013.01); *E05Y 2900/502* (2013.01)
USPC ............................................ 16/82; 29/525.11

(58) Field of Classification Search
USPC ......... 16/82, 85, 86 R, 86 A, 375; 29/525.11; 292/DIG. 15, DIG. 19, 90, 252; 403/122; 411/411–413
See application file for complete search history.

(56) References Cited

U.S. PATENT DOCUMENTS

| | | | | | |
|---|---|---|---|---|---|
| 2,109,228 | A | * | 2/1938 | Carlson | 16/86 A |
| 2,454,414 | A | * | 11/1948 | Taylor | 292/70 |
| 2,496,691 | A | * | 2/1950 | Berry | 292/251.5 |
| 2,760,224 | A | * | 8/1956 | Hennelly | 16/86 A |
| 2,813,293 | A | * | 11/1957 | Gennaro | 16/375 |
| 2,933,754 | A | * | 4/1960 | Winans | 16/42 R |
| 3,187,372 | A | * | 6/1965 | Parsons | 16/375 |
| 3,701,557 | A | * | 10/1972 | Centofante et al. | 292/251.5 |
| 3,750,259 | A | * | 8/1973 | Timmons | 29/402.11 |
| 3,781,047 | A | * | 12/1973 | Surko, Jr. | 292/251.5 |

(Continued)

FOREIGN PATENT DOCUMENTS

| | | |
|---|---|---|
| DE | 102006057046 B3 | 2/2008 |
| FR | 2888155 A1 | 1/2007 |
| FR | 2929668 A1 | 10/2009 |

OTHER PUBLICATIONS

European Search Report and European Search Opinion, dated May 6, 2013.

*Primary Examiner* — William Miller
(74) *Attorney, Agent, or Firm* — Quarles & Brady LLP

(57) ABSTRACT

A door stop pin assembly for a housing having a through hole is disclosed. The assembly includes a door stop pin having a body with a base pad attached to one end of the body and a recess formed in the other end of the body, the body having external threads formed in a first threading direction and internal threads formed in the recess in a second threading direction, and a locking screw having external threads also formed in the second threading direction. The external threads of the door stop pin engage internal threads formed on at least one of the through hole or a bushing inserted into the through hole to position the door stop pin relative to the housing. The external threads of the locking screw engage the internal threads of the recess to lock the door stop pin in position. Methods of assembling the same are also disclosed.

15 Claims, 6 Drawing Sheets

(56) References Cited

U.S. PATENT DOCUMENTS

| | | | |
|---|---|---|---|
| 4,852,919 A * | 8/1989 | Nimee et al. | 292/251.5 |
| 5,241,725 A | 9/1993 | Hamatani et al. | |
| 5,876,236 A * | 3/1999 | Chen | 439/419 |
| 7,536,746 B2 | 5/2009 | Rutledge et al. | |
| 8,240,722 B2 * | 8/2012 | Dieling et al. | 292/90 |
| 2007/0234511 A1 | 10/2007 | Rutledge | |
| 2008/0168619 A1 | 7/2008 | Gonzalez et al. | |

* cited by examiner

DOOR STOP PIN AND RELATED ASSEMBLY

CROSS-REFERENCE TO RELATED APPLICATION

This application claims priority to U.S. Provisional Patent Application No. 61/263,181, filed Nov. 20, 2009, which is hereby incorporated by reference as if set forth in its entirety herein.

STATEMENT OF FEDERALLY SPONSORED RESEARCH OR DEVELOPMENT

Not applicable.

BACKGROUND OF THE INVENTION

This invention relates to a door stop pin for an aircraft door, a related assembly, and a method of assembling the same.

An aircraft typically includes various types of doors and door frames that connect the interior of the aircraft to the exterior, such as cabin doors, cargo doors, emergency doors and the like. These door assemblies are subjected to relative motion and misalignment due to in-flight pressurization of the cabin, flight loads applied to external surfaces, mechanical vibrations, and other sources. To address this problem, aircraft door assemblies include devices commonly referred to as "door stop pins" to ensure loads are transferred between the door and the door frame at pre-established locations.

However, the construction of an aircraft door including door stop pins is often costly and/or time consuming. The process of assembling the door may be tedious, sometimes involving trial and error, as the door stop pins may need to be positioned and re-positioned to ensure proper alignment of the pins.

To minimize the labor required at the assembly stage, the door stop pins and door may be fabricated with additional features, such as keys, keyways, and locking springs to speed the assembly operation and to maintain the position of the door stop pin thereafter. Such a configuration may require specific cuts to be manufactured into the end of the door stop pin to allow for locking of the spring, however, these configurations still do not allow for precise adjustments when installing the door stop pins on the door. Additionally, the formation of such features on the door stop pins and other door parts greatly add to the cost of the components.

Thus, there remains a need for a low cost, easy to assemble door stop pin assembly for an aircraft that allows for precise adjustment when installing the door stop pin into the aircraft door.

SUMMARY OF THE INVENTION

In one form, the present invention provides for a door stop pin that includes an axially-extending body having a base pad attached to one end of the body and an axially-extending recess formed in the other end of the body. The body of the door stop pin has external threads formed thereon in a first threading direction and the recess has internal threads in a second threading direction. The base pad may be integrally formed with the body of the door stop pin, or the base pad may be formed as a separate component from the body.

In another form, the base pad may include a helical gap configured to reduce the rigidity of the base pad such that the door stop pin may be compressed towards the body, but may return to a normal position in response to the compression.

In yet another form, the door stop pin may include a gasket that separates the base pad from the body, wherein the gasket is configured to push against the base pad to return the base pad to a normal position in response to the base pad being compressed towards the body.

The present invention also provides for a method of assembling a door stop pin in a housing having a through hole. The method includes screwing, in a first threading direction and from a first axial direction, the door stop pin into the through hole or a bushing inserted into the through hole, thereby positioning the door stop pin relative to the housing. The method also includes screwing, in a second threading direction opposite the first threading direction and from a second axial direction opposite the first axial direction, a locking screw into a recess formed in the door stop pin, thereby locking the door stop pin in place. The locking screw may be screwed into the recess until the head of the locking screw engages the bushing, or until the head of the locking screw engages the housing, regardless of whether a bushing is used.

In addition, the present invention provides for a door stop pin assembly for a housing having a through hole where the assembly comprises a door stop pin having an axially-extending body with a base pad attached to one end of the body and an axially-extending recess formed in the other end of the body. The body may have external threads formed in a first threading direction and internal threads formed in the recess in a second threading direction. A locking screw may have external threads also formed in the second threading direction. The door stop pin in the assembly is configured to be placed in the through hole with the external threads of the door stop pin engaging internal threads formed on at least one of the through hole or a bushing inserted into the through hole to position the door stop pin relative to the housing. The external threads of the locking screw may engage the internal threads of the recess to lock the door stop pin in position. The door stop pin and the locking screw may be co-axial with one another.

In another form, the door stop pin assembly may be configured such that the base pad of the door stop pin is spaced from a side of the housing.

In addition, the door stop pin assembly may be configured with the bushing being inserted into the housing and defining at least a part of the through hole, with the bushing including threads in the first threading direction. The bushing may include a flange that contacts a side of the housing to position the bushing relative to the housing.

In yet another form, the door stop pin assembly may be configured such that a head of the locking screw engages the bushing.

In still another form, the door stop pin assembly may be configured such that a head of the locking screw engages the housing.

In one form, the door stop pin assembly may include a door stop pin with a base pad that is integrally formed with the body. The base pad may include a helical gap configured to reduce the rigidity of the base pad such that the door stop pin may be compressed towards the body, but will return to a normal position in response to the compression.

In a different form, the base pad may be formed as a separate component from the body and the door stop pin may include a gasket that separates the base pad from the body and the gasket is configured to push against the base pad to return the base pad to a normal position in response to the base pad being compressed towards the body.

DETAILED DESCRIPTION OF THE PREFERRED EMBODIMENTS

Figure 1:
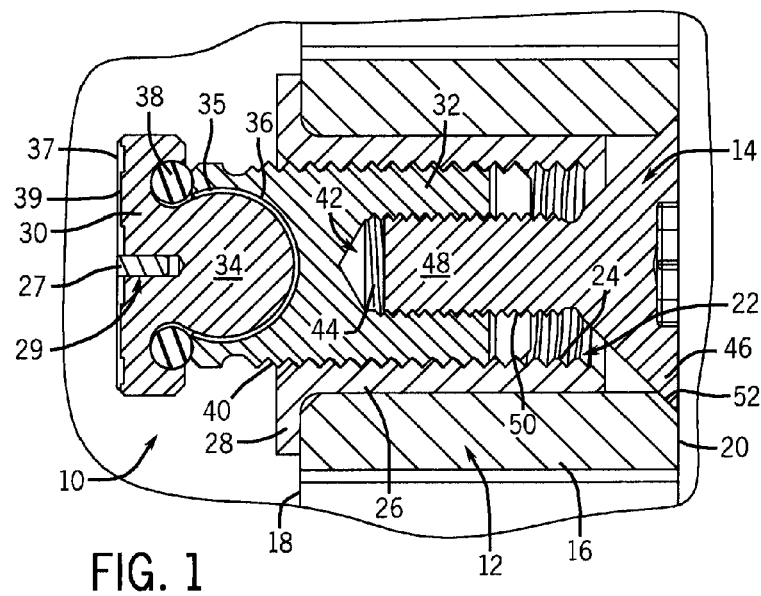
FIG. 1 is a side cross-sectional view of a door stop pin assembly in which the door stop pin has a ball and socket joint at the base pad, a threaded bushing is inserted into the housing to define a portion of the through hole, and the head of the locking screw engages a wall of the housing.
Figure 2:
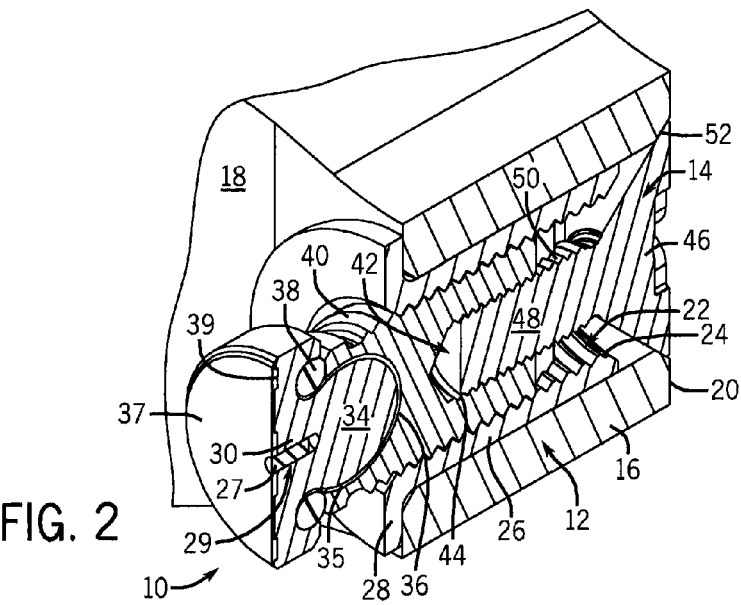
FIG. 2 is an isometric cross-sectional view of the assembly of FIG. 1.
Figure 3:
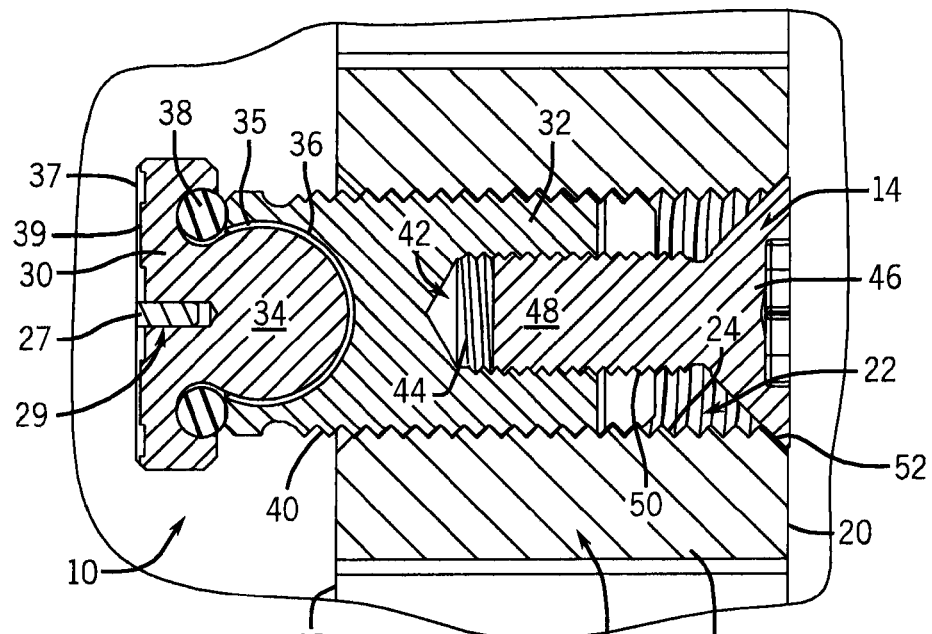
FIG. 3 is a side cross-sectional view of the door stop pin assembly similar to FIG. 1, but in which the threaded bushing has been removed and the threads have instead been integrally formed on a wall of the housing.
Figure 4:
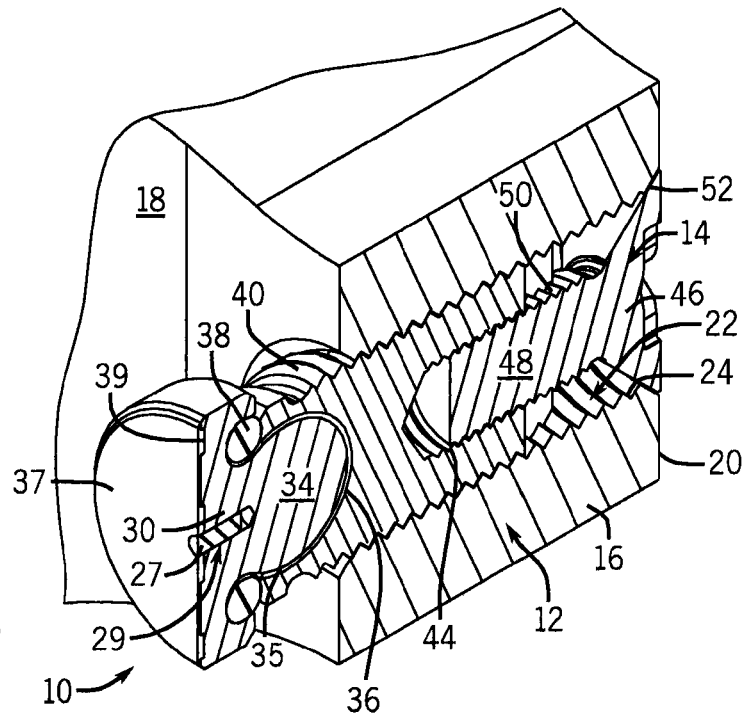
FIG. 4 is an isometric cross-sectional view of the assembly of FIG. 3.
Figure 5:
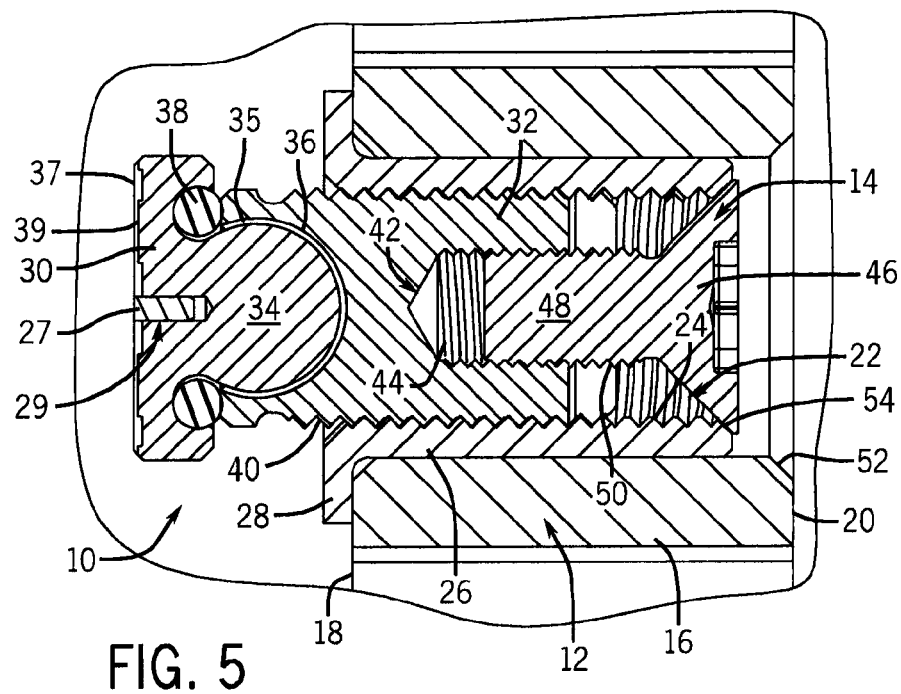
FIG. 5 is a side cross-sectional view of the door stop pin assembly similar to FIG. 1, but in which the head of the locking screw engages an end of the bushing.
Figure 6:
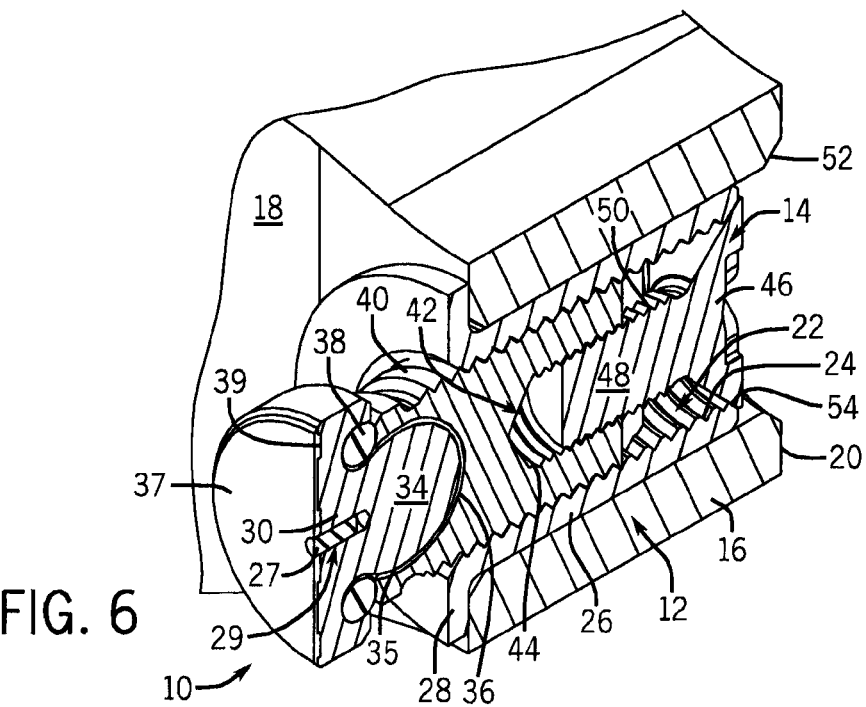
FIG. 6 is an isometric cross-sectional view of the assembly of FIG. 5.
Figure 7:
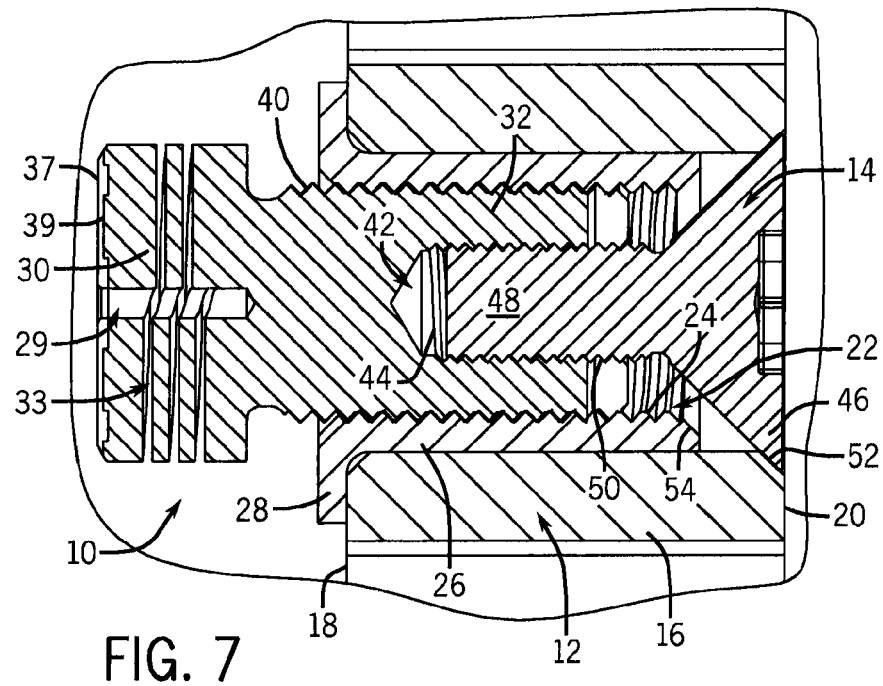
FIG. 7 is a side cross-sectional view of the door stop pin assembly similar to FIG. 1, but in which the door stop pin has a different style base pad and body and the conductive pin is removed.
Figure 8:
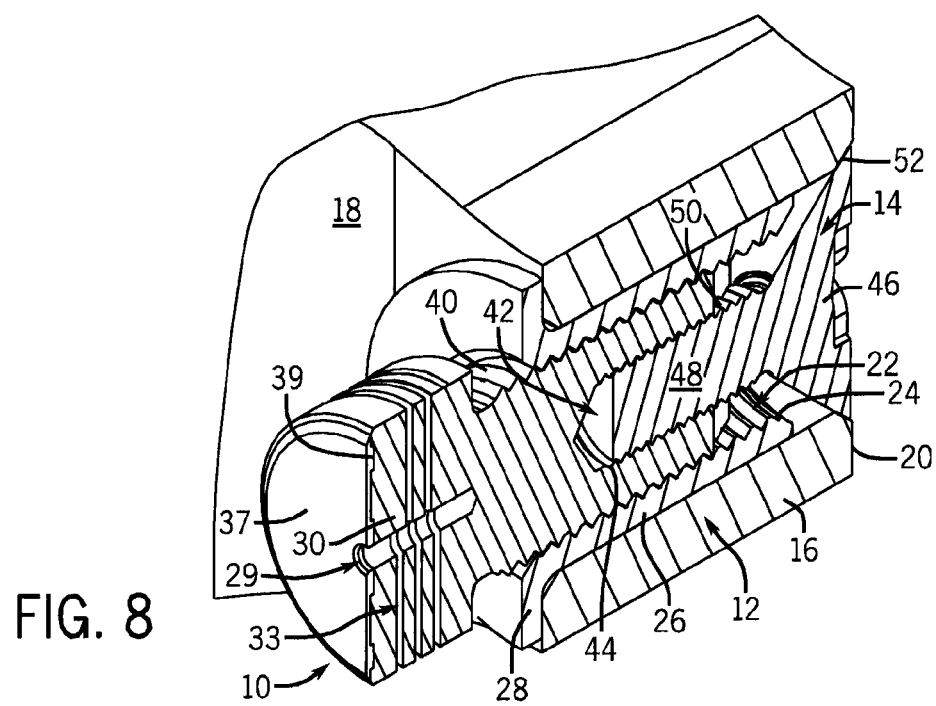
FIG. 8 is an isometric cross-sectional view of the assembly of FIG. 7.
Figure 9:
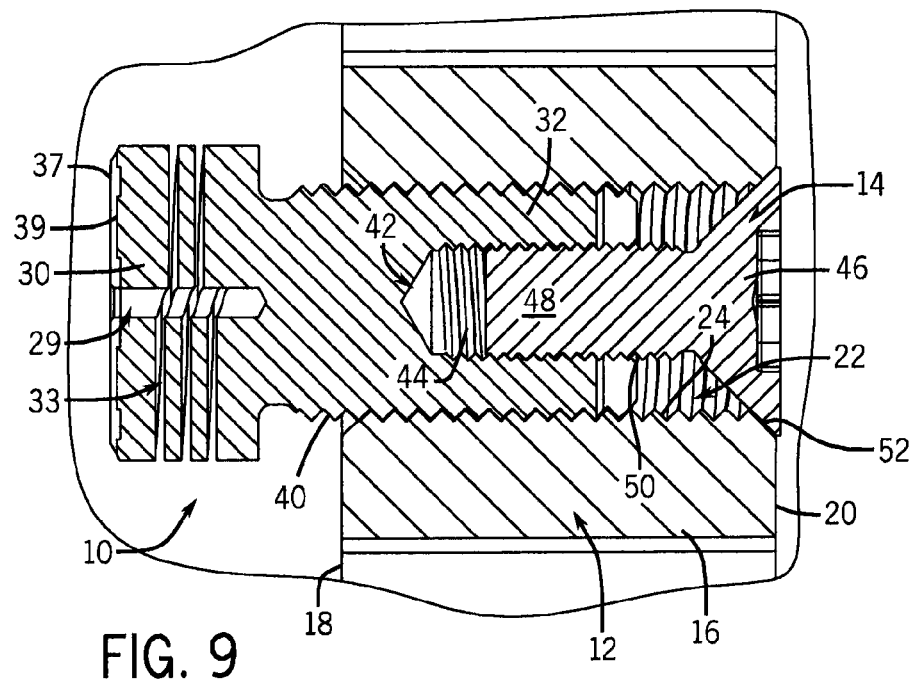
FIG. 9 is a side cross-sectional view of the door stop pin assembly similar to FIG. 7, but in which there is no threaded bushing and the threads are now integrally formed in the wall of the housing.
Figure 10:
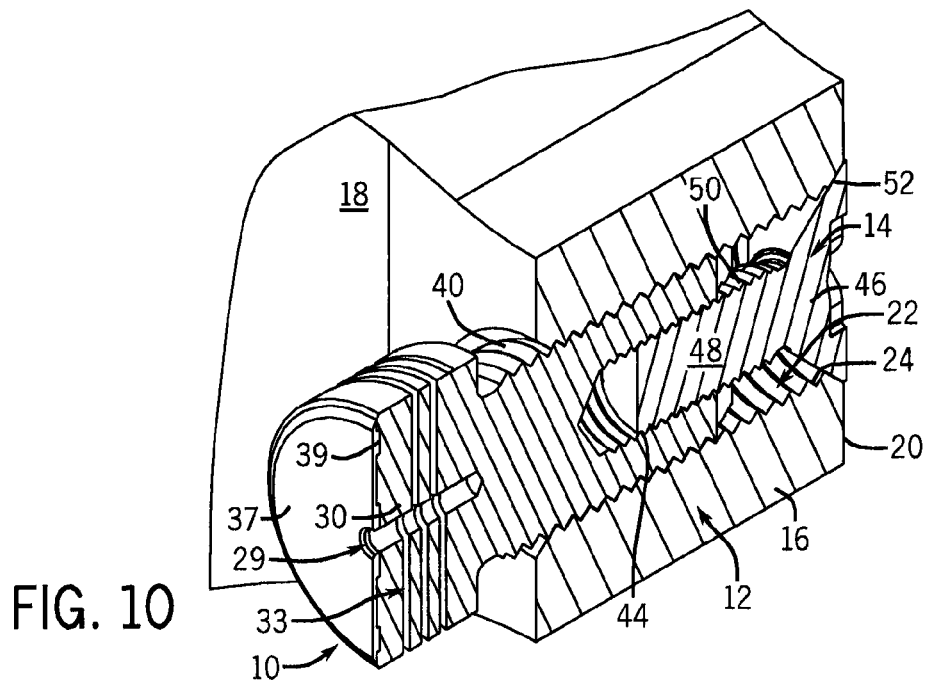
FIG. 10 is an isometric cross-sectional view of the assembly of FIG. 9.
Figure 11:
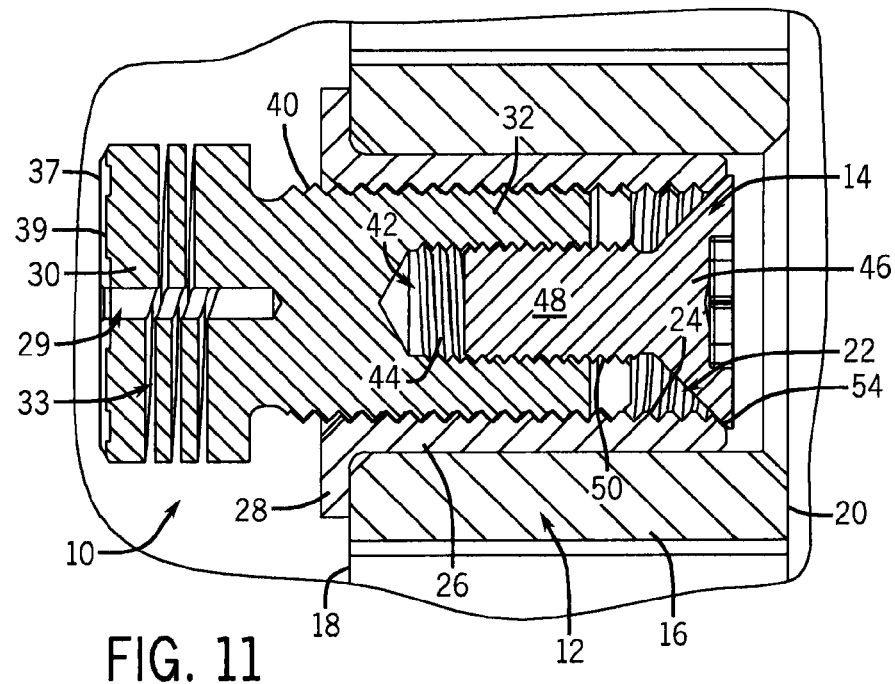
FIG. 11 is a side cross-sectional view of the door stop pin assembly similar to FIG. 7, but in which the head of the locking screw engages an end of the bushing.
Figure 12:
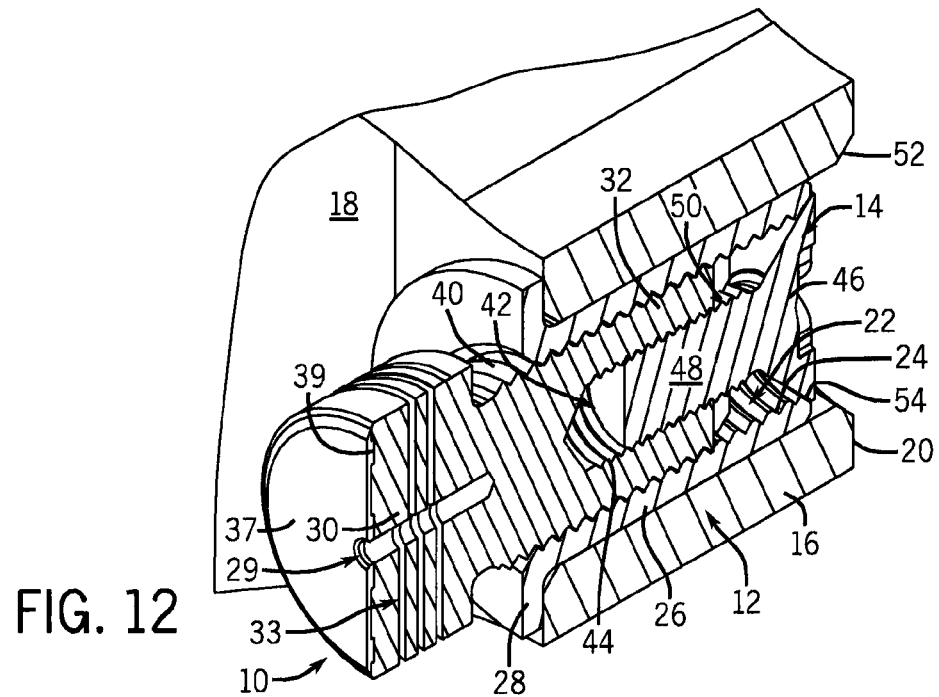
FIG. 12 is an isometric cross-sectional view of the assembly of FIG. 11.

Referring to FIGS. 1-12, various door stop pin assemblies are illustrated. In each of the assemblies, a door stop pin 10 is inserted into a housing 12 and fixed in position with a locking screw 14 that is co-axially threaded into the door stop pin 10. As will be described in more detail below, the door stop pin 10 is positioned by threading the door stop pin 10 into the housing 12 (or a bushing 26 comprising part of the housing 12) in a first threading direction. Then, the lock screw 14 is threaded into the door stop pin 10 in a second threaded direction to lock the door stop pin 10 in place.

The housing 12 which receives the door stop pin 10 may be a part of the door or a part of the door frame, depending on the particular configuration of the aircraft door. The housing 12 includes a wall 16 with a first housing side 18 and a second housing side 20. A through hole 22 extends from the first housing side 18 to the second housing side 20. The through hole 22 includes a radially inward-facing threaded surface 24 which may be formed either on a bushing 26 inserted into the housing 12 (as shown in FIGS. 1, 2, 5-8, 11, and 12) or may be integrally formed in the wall 16 (as shown in FIGS. 3, 4, 9, and 10). In the case that a bushing 26 is inserted into the housing 12, the bushing 26 may be press fit into an opening pre-formed in the through hole 22 in the housing 12. The bushing 26 may further include a flange 28 that abuts the first housing side 18 to position the bushing 26 in the housing 12.

The door stop pin 10 is inserted into the through hole 22 of the housing 12. The door stop pin 10 is generally bolt-shaped and includes a base pad 30 attached to a cylindrical body 32. The composition of the body 32 and the base pad 30 of the door stop pin 10 may be selected from materials that may help to reduce the onset of galling. These materials include, but are not limited to, ToughMet®, aluminum bronze, aluminum nickel bronze, nitronic 60, copper beryllium, 660 bronze, high-lead tin bronze, copper casting alloys, plastics, and composites. The base pad 30 and body 32 may be composed of the same materials, but need not be.

FIGS. 1-6 show a first style of base pad in which a ball and socket joint is formed between the base pad 30, having a ball 34, and the body 32, having a socket 36. In this configuration, the base pad 30 is formed as a separate component from the body 32. The ball 34 of the base pad 30 is retained in the socket 36 of the body 32 by swaging or mechanically closing the socket 36 over the ball 34. The area of contact between the base pad 30 with the body 32 through the ball 34 and socket 36 ensures that the load will be more uniformly distributed when the door stop pin 10 is loaded, such as when the door is shut. This feature will help to increase the life of the door stop pin 10.

FIGS. 7-12 show a second style of base pad in which the base pad 30 is integrally formed with the body 32, which will be discussed in more detail below. Of course, these styles are for illustration only and it will be appreciated by persons of ordinary skill in the art that other types of connectivity between the base pad 30 and body 32 may be utilized, that the base pad 30 may have other shapes, and/or that the base pad 30 may be adapted to receive a tool such as a screwdriver or hex key.

Referring back to the first configuration of the door stop pin 10 as seen in FIGS. 1-6, a lubricant liner 35 may be placed between the ball 34 of the base pad 30 and the socket 36 of the body 32. The lubricant 35 may help prevent galling in the ball and socket joint and may be applied to either the ball 34 or the socket 36.

Similarly, a lubricant liner 37 may also be placed on the back surface 39 of the base pad 30 (as seen in FIGS. 1-12). Liner 37 may help prevent galling between the bottom surface 39 of the base pad 30 with a mating surface, such as a door or door frame.

The lubricant liners 35, 37 may be composed of a material such as polytetrafluoroethylene (PTFE), or any other suitable lubricant. One feature that may factor into the selection of the lubricant is whether it is necessary to have the lubricant liners 35, 37 conduct electricity for passing an electrical charge from the door to the door frame, or vice versa, through the door stop pin 10. Such a feature may be desired for grounding lightning strikes or for static discharge. However, lubricant liners 35, 37 need not be placed on the door stop pin 10. Rather, the selection of materials for the body 32 and the base pad 30 of door stop pin 10 may be formed from conductive materials that, by themselves, reduce the onset of galling.

The door stop pin may also include a conductive pin 27 that is placed within a hole 29 on the back surface 39 of the door stop pin 10, as seen in FIGS. 1-6. While the conductive pin 27 is not shown in FIGS. 7-12 (for clarity purposes as will be described below), the door stop pin 10 in FIGS. 7-12 is capable of including a conductive pin 27 in the hole 29. Alternatively, the conductive pin 27 may be integrally formed with the base pad 30 of the door stop pin 10.

When the liner 37 is selected as a non-conductive material, the conductive pin 27 provides the functionality of conducting an electrical charge from the door or door frame to the base pad 30. To do so, the back surface of the conductive pin 27 may be flush with the back surface of the liner 37, such that the conductive pin 27 engages the door or door frame. Even if the liner 37 is composed of a conductive material, the conductive pin 27 may still be used in the door stop pin 10.

A gasket 38, such as an O-ring, is positioned between the base pad 30 and the body 32 proximate the joint to seal the joint and to urge the base pad 30 and the body 32 into a particular alignment with one another, but such that they still may be slightly misaligned to accommodate the placement of the door in the door frame. The ability of the base pad 30 and the body 32 to be misaligned during the mating of the door and door frame helps reduce the onset of galling between the base pad 30 and the door or door frame.

The gasket 38 not only seals the joint between the ball 34 and the socket 36, but may also provide a spring mechanism to return the base pad 30 to a normal position after the base pad 30 is compressed towards the body 32. When the door is opened, the door or door frame may press against the base pad 30 such that the base pad 30 is urged axially towards the body 32 of the door stop pin 10. This results in the gasket being elastically deformed between the based pad 30 and the body 32. After the force is removed from the base pad 30, the gasket 38 urges the base pad 30 back to its normal position. The door stop pin is thus ready to engage the door or door frame again.

In addition to these functions, the gasket 38 may be composed of a conductive material such that an electrical charge may be passed from the door or door frame to the base pad 30, which may in turn be conducted from the base pad 30 through the gasket 38 and to the body 32 of the door stop pin 10. The conductivity of the gasket 38 is important if a non-conductive liner 35 is used in the ball and socket joint, as any electrical charge in that circumstance will be passed between the base pad 30 and the body 32 through the gasket 38. However, if a conductive liner 35 is used in the door stop pin 10, the door stop pin may include a gasket 38 that is composed of a non-conductive material.

Turning now to FIGS. 7-12, a second style of door stop pin 10 is shown in which the base pad 30 is integrally formed with the body 32. As this style of door stop pin 10 is of unitary construction, it may result in cost savings. While this configuration does not incorporate a gasket 38, as seen in FIGS. 1-6, the base pad 30 may be configured to incorporate a helical gap 33. The helical gap 33 reduces the rigidity of the base pad 30, such that the base pad 30 may still allow for misalignment of the door stop pin during installation of the door, as well as provide the spring mechanism referred to above with respect to a compressive force applied to the base pad 30.

As stated above, the configuration of the door stop pin 10 shown in FIGS. 7-12 may also include a conductive pin 27. However, the conductive pin is not shown in FIGS. 7-12 to provide a clear view of the helical gap 33. As described above, the conductive pin 27 may be a separate feature from the base pad 30 and be placed in the hole 29 on the back surface 39 of the base pad, or alternatively, the conductive pin 27 may be formed integrally with the base pad 30.

In either style of base pad 30 configuration for the door stop pin 10 (i.e. with or without an integral base pad 30), however, the body 32 of the door stop pin 10 has a radially outwardly-facing threaded surface 40 which, when the door stop pin 10 is inserted and screwed in the through hole 22 of the housing 12, threadably engages the radially inward-facing threaded surface 24 of the through hole 22. The position of the door stop pin 10 and, accordingly, the distance from the bottom surface 39 of the base pad 30 of the door stop pin 10 to the first housing side 18, may be adjusted by screwing or unscrewing the body 32 of the door stop pin 10 in the through hole 22. By having the mating threaded surfaces 40, 24 to position the door stop pin 10 with respect to the housing 12, precise adjustment of the door stop pin 10 may be realized with ease.

The body 32 of the door stop pin 10 also includes a recess 42 on the end of the body 32 opposite the end on which the base pad 30 is located. The recess 42 has a radially inward-facing threaded surface 44 formed therein. The central axis of the radially inward-facing threaded surface 44 of the recess 42 is co-axial with the central axis of the radially outward-facing threaded surface 40 of the body 32 of the door stop pin 10.

Notably, the radially inward-facing threaded surface 44 of the recess 42 is threaded in a handedness which is opposite the radially outward-facing threaded surface 40 of the body 32 of the door stop pin 10 and the radially inward-facing threaded surface 24 of the through hole 22 of the housing 12. For example, in the forms shown, the radially outward-facing threaded surface 40 is threaded in a right-handed direction whereas the radially inward-facing threaded surface 44 of the recess 42 is threaded in a left-handed direction.

Once the door stop pin 10 is adjusted to the desired position, such that a bottom surface 39 of the base pad 30 is spaced a desired distance from the housing 12, the locking screw 14 may be screwed into the assembly. The recess 42 will mate with the locking screw 14 to secure the position of the door stop pin 10. The locking screw 14 includes a head 46 and a body 48 having a radially outward-facing threaded surface 50. As the radially outward-facing threaded surface 50 of the body 48 of the locking screw 14 is received into the recess 42 of the door stop pin 10, the handedness of the radially outward-facing threaded surface 50 matches the radially inward-facing threaded surface 44 of the recess 42 (which, again, is opposite the handedness of threaded surfaces 24 and 40). As will be described in more detail below, this accommodates the locking of the door stop pin 10 during assembly.

As shown, the head 46 of the locking screw 14 has a countersunk head style. This countersunk style allows for the locking screw 14 to be flush with the second housing side 20 upon tightening if the locking screw 14 seats in a countersunk opening. However, it will be appreciated that other head styles could also be used.

During assembly, once the door stop pin 10 has been threaded into the desired position, the locking screw 14 is inserted from the second housing side 20 and is threaded into the recess 42 by the threaded engagement of the radially outward-facing threaded surface 50 of the locking screw 14 and the radially inward-facing threaded surface 44 of the recess 42. The locking screw 14 is tightened until the head 46 of the locking screw 14 contacts either a bevel 52 on the wall 16 of the housing 12 proximate the second housing side 20 (as in FIGS. 1-4 and 7-10) or a bevel 54 on the end of the bushing 26 opposite the flange 28 (as in FIGS. 5, 6, 11, and 12), and the inward-facing threaded surface 24 tightens against the outward facing threaded surface 40 of the door pin 10 to inhibit rotation of the pin.

By engineering the door stop pin assembly such that the door stop pin 10 threads into the through hole 22 of the housing 12 in a first threaded direction while the locking screw 14 threads into the door stop pin 10 in a second threaded direction, a secure placement of the door stop pin 10 within the housing 12 is achieved. In contrast to a locking system in which all of the threads are formed in a single direction or handedness, the disclosed door stop pin assembly will not present the possibility that the door stop pin 10 will be significantly re-positioned as the locking screw 14 is tightened into place. The disclosed door stop pin assembly is quick and easy to construct as it does not require the formation of keys, keyways, or the like to achieve proper placement of the door stop pin 10. The assembly also allows for precise adjustment of the door stop pin 10 in the housing 12 and a locking feature that reliably maintains the position of the door stop pin 10 during use.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A door stop pin comprising an axially-extending body having a base pad at one end of the body and an axially-extending recess formed in the other end of the body, wherein the base pad includes a helical gap configured to reduce rigidity of the base pad such that a bottom surface of the base pad compresses towards the body, but returns to a normal position in response to the compression.

2. A method of assembling a door stop pin in a housing having a through hole, the method comprising:
   screwing, in a first threading direction and from a first axial direction, the door stop pin into the through hole or a bushing inserted into the through hole, thereby positioning the door stop pin relative to the housing, wherein positioning the door stop pin in the housing includes spacing a bottom surface of a base pad of the door stop pin from the housing; and
   screwing, in a second threading direction opposite the first threading direction and from a second axial direction opposite the first axial direction, a locking screw into a recess formed in the door stop pin, thereby locking the door stop pin in place.

3. The method of claim 2, further including the step of first inserting the bushing in the housing.

4. The method of claim 3, wherein the step of screwing the locking screw into the recess continues until a head of the locking screw engages the bushing.

5. The method of claim 2, wherein the step of screwing the locking screw into the recess continues until a head of the locking screw engages the housing.

6. The method of claim 2, wherein the door stop pin includes an axially-extending body having the base pad attached to one end of the body that is opposite the other end of the door stop pin having the recess, the base pad is integrally formed with the body, and the base pad includes a helical gap configured to reduce the rigidity of the base pad, such that the bottom surface of the base pad compresses towards the body, but returns to a normal position in response to the compression.

7. The method of claim 2, wherein the door stop pin includes an axially-extending body having the base pad attached to one end of the body that is opposite the other end of the door stop pin having the recess and a gasket between the base pad and the body, wherein the base pad is formed as a separate component from the body and the gasket urges the base pad to return to a normal position in response to the base pad being compressed towards the body.

8. A door stop pin assembly for a housing having a through hole, the door stop pin assembly comprising:
   a door stop pin having an axially-extending body with a base pad at one end of the body and an axially-extending recess formed in the other end of the body, said body having external threads formed thereon in a first threading direction and internal threads formed in the recess in a second threading direction; and
   a locking screw having external threads also formed in the second threading direction;
   wherein the door stop pin is configured such that it is placed in the through hole, the external threads of the door stop pin engaging internal threads formed on at least one of the through hole or a bushing inserted into the through hole to position the door stop pin relative to the housing, and the external threads of the locking screw engaging the internal threads of the recess to lock the door stop pin in position, wherein the door stop pin includes a conductive pin.

9. The door stop pin assembly of claim 8, wherein the base pad of the door stop pin is spaced from a side of the housing.

10. The door stop pin assembly of claim 8, wherein the bushing is inserted into the housing and defines at least a part of the through hole and includes threads in the first threading direction and a flange that contacts a side of the housing to position the bushing relative to the housing.

11. The door stop pin assembly of claim 8, wherein a head of the locking screw engages the bushing.

12. The door stop pin assembly of claim 8, wherein a head of the locking screw engages the housing.

13. The door stop pin assembly of claim 8, wherein the door stop pin and the locking screw are co-axial with one another.

14. The door stop pin assembly of claim 8, wherein the base pad is integrally formed with the body and the base pad includes a helical gap configured to reduce the rigidity of the base pad, such that a bottom surface of the base pad compresses towards the body, but returns to a normal position in response to the compression.

15. The door stop pin assembly of claim 8, wherein the door stop pin includes a gasket between the base pad and the body, the base pad is formed as a separate component from the body, and the gasket urges the base pad to return to a normal position in response to the base pad being compressed towards the body.

* * * * *